United States Patent

Yoshii

[15] 3,660,810

[45] May 2, 1972

[54] TAPE TERMINATION ALARM DEVICE

[72] Inventor: Tetsuji Yoshii, Neyagawa, Japan

[73] Assignee: Matsushita Electric Industrial Co., Ltd., Osaka, Japan

[22] Filed: Mar. 9, 1970

[21] Appl. No.: 17,615

[30] Foreign Application Priority Data

Mar. 13, 1969 Japan ....................44/23752
Mar. 13, 1969 Japan ....................44/23753

[52] U.S. Cl. ..........340/259, 340/399, 179/100.2 Z, 226/100, 242/57

[51] Int. Cl. ..........G08b 19/00

[58] Field of Search ..........340/259, 267, 392, 396, 399, 340/402; 242/57; 116/67 B; 179/100.2 Z; 274/4 C, 4 E, 4 F, 4 D, 11 C, 11 D; 226/100

[56] References Cited

UNITED STATES PATENTS

| | | | |
|---|---|---|---|
| 1,346,358 | 7/1920 | Wanderhold | 116/67 A |
| 1,924,395 | 8/1933 | Bossard | 340/392 |
| 2,685,950 | 8/1954 | Demby | 242/57 UX |
| 2,727,226 | 12/1955 | Giskes et al. | 340/259 |
| 2,948,258 | 8/1960 | Koechel | 116/67 A |

*Primary Examiner*—John W. Caldwell
*Assistant Examiner*—Michael Slobasky
*Attorney*—Stevens, Davis, Miller & Mosher

[57] ABSTRACT

In a magnetic tape recording and/or reproducing apparatus, a device for giving an alarm sounds when the magnetic tape runs out in a tape reel. The device comprises a tension change sensing element adapted to sense a change in tension of the tape, a sound producing member and a rotating body which keeps on rotating even after the termination of the tape feeding, and is operative in such a manner that when the tape feeding is terminated, the tension change sensing element is displaced as a result of a change in tension of the tape at the end portion thereof, thereby bringing the sound producing member into engagement with the rotating body to produce an alarm sound.

6 Claims, 8 Drawing Figures

PATENTED MAY 2 1972

3,660,810

SHEET 1 OF 2

T. YOSHII

INVENTOR

BY Stevens, Davis, Miller & Mosher

ATTORNEY

TAPE TERMINATION ALARM DEVICE

The present invention relates to an alarm device in a magnetic tape recorder, which gives an alarm sound when the tape feeding is terminated. The device of the invention is particularly effective for use in a cassette-type magnetic tape recorder wherein a magnetic tape is accommodated in a cassette, with the terminal ends thereof fixed to the reel hubs.

In a cassette-type magnetic tape recorder, since the tape is accommodated in a cassette, there has been the inconvenience that the termination of feeding of a recorded tape or unrecorded tape can hardly be made known to the user. The object of the present invention, therefore, is to eliminate such inconvenience and to provide means for alarming the termination of tape feeding in a very simple construction.

As a method of detecting the terminal end of a tape, there has been proposed a device which is so designed that a sound is produced from a speaker when a metal foil, attached to a predetermined location of the tape end is detected by two electrodes. The conventional device of the type described, however, has the disadvantages that the metal foil must be attached precisely at the predetermined location of the tape and that the electrodes and other associated elements must be arranged with high precision. Furthermore, the device is not useful at all when the tape used is not provided with such metal foil, whereas if the user attempts to attach the metal foil by himself, he must go through an extremely cumbersome procedure.

The device according to the present invention is capable of making the user aware of the termination of tape feeding, without requiring any work to be done on the tape and yet be of simple construction. In addition, since the function of the device resorts solely to a mechanical operation, the device is useful not only for the recording operation but also in a reproducing operation, and can be provided at an extremely low cost.

In order to attain the object set forth above, the device of the present invention comprises a tension change sensing element adapted to sense an increase in tension of a magnetic tape or the presence or absence of the tape by engagement with said tape, a sound producing member and a rotating body which keeps on rotating even after the tape stops running or the tape is run out, said sound producing member being brought into engagement with said rotating body by said tension change sensing element when said tension change sensing element is displaced as a result of the tape tension being increased at the end portion of the tape, whereby an alarm sound is produced to make the user aware of the termination of tape feeding.

The present invention will be described hereinafter by way of embodiments thereof with reference to the accompanying drawings, in which.

Figure 1:
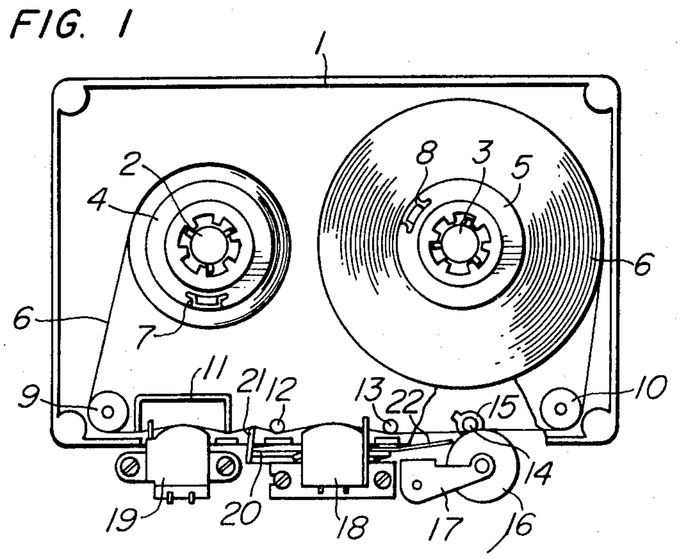
FIG. 1 is a plan view of the pertinent portion of a magnetic tape recording and/or reproducing apparatus provided with the tape termination alarm device according to the present invention, showing a magnetic tape being in the normal running condition.
Figure 2:
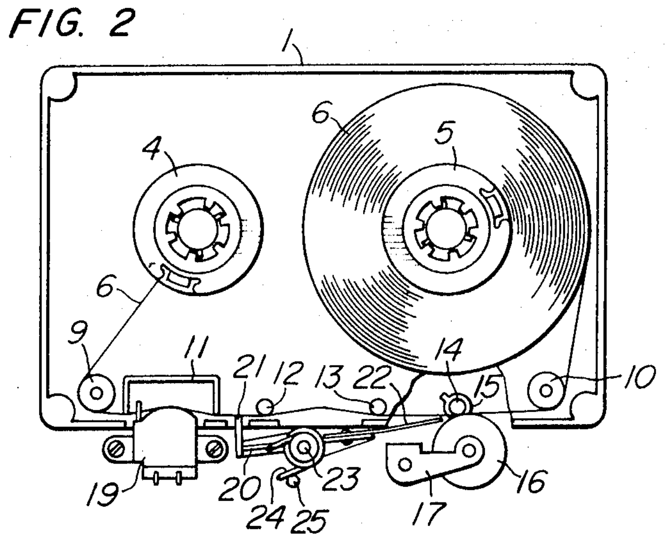
FIG. 2 is a plan view similar to FIG. 1 but showing the magnetic tape having been used up to the terminal end thereof.

In FIGS. 1 and 2 which exemplify the device of this invention as applied to a cassette-type magnetic tape recording and/or reproducing apparatus, a portion of the cassette is cut away to clearly show the structure of the device. In FIG. 2, the apparatus is shown with the recording and/or reproducing head additionally removed. In these Figures, reference numeral 1 generally designates a tape cassette inserted into the tape recording and/or reproducing apparatus, and 2 and 3 are a supply reel support shaft and a takeup reel support shaft respectively of the said apparatus. In the tape cassette 1 is accommodated a magnetic tape 6 which is wound on a supply reel hub 4 with one end thereof fixed to a tape fixing portion of said supply reel hub, with the other end being extended along a tape guide roller 9, a tape guide 11, guide pins 12 and 13, a capstan 14 and another tape guide roller 10 and fixed to a tape fixing portion 8 of a takeup reel hub 5. On the magnetic tape recording and/or reproducing apparatus are provided a pinch roller 16 which is carried on a support arm 17 and cooperating with the capstan 14, a recording and/or reproducing head 18 and an erasing head 19. The tape termination alarm device according to the present invention comprises a rotating body 15 which is tightly fitted on the capstan 14 and has a projection as shown, a tension arm 20 which has a lug 21 and is pivotally mounted on a pivot pin 23, and a sound producing member 22, said tension arm 20 being held in pressure contact with the tape under the biasing force of a spring 24. If the cassette-type magnetic tape recording and/or reproducing apparatus is of the type wherein the heads and the pinch roller are mounted on a movable support, as usual, the assembly of the parts 20 to 25 is also mounted on the same movable support, so that the device of the invention may be actuated only when the tape is recorded and/or reproduced.

Now, the operation of the present device will be explained with reference to FIGS. 1, 2 and 4 hereunder: As shown in FIG. 1, in the normal condition of tape feeding, the magnetic tape 6 wound on the supply reel hub 4 is driven by the capstan 14, rotating in pressure engagement with the pinch roller 16, and taken up on the takeup reel hub 5, while passing around the guide roller 9, the erasing head 19 and the recording and/or reproducing head 18. The lug 21 of the tension arm 20 pushes the tape 6, under the influence of the spring 24, up to a point where the biasing force of said spring and the tension of the tape are balanced. Under such condition, the sound producing member 22 connnected to the other end of the tension arm 20 is held away from the rotating body 15 fitted on the capstan 14 and hence no sound is produced.

When the tape stored on the supply reel hub 4 has been exhausted, the tension of the tape increases tremendously, since the trailing end of said tape is fixed to said reel hub, and the tape 6 pushes back the lug 21 overcoming the biasing force of the spring 24. As a result, the tension arm 20 pivots about the pivot pin 23 and the free end of the sound producing member 22 is displaced into the track of rotation of the projection of the rotating body 15. Since the rotating body 15 is continuously rotating even after the termination of tape feeding as a result of exhaustion of the tape, the free end of the sound producing member 22 is repeatedly beaten to vibrate by the projection of the rotating body 15 and the vibrating member 22 in turn beats another sound producing member 33 to produce an alarm sound.

Although in the embodiment described above, the change in tension of the tape upon termination of the tape feeding is sensed by the end of the tension arm in direct contact with the tape, it should be obvious that any other means may optionally be used as long as it is capable of sensing such tension change of the tape. For instance, if the supply reel support is supported so as to be displaceable according to the tension of the tape, an alarm sound can also be obtained by bringing the sound producing member into engagement with the rotating body, utilizing the displacement of the supply reel support. Such an arrangement is exemplified in FIG. 3. In FIG. 3, components corresponding to those shown in FIGS. 1 and 2 are indicated by the same reference numbers. Reference numeral 26 designates a flywheel integral with the capstan and 27 designates a reel support arm pivotally mounted on a pivot pin 28. Reference numeral 29 designates an oscillating sound producing member consisting of a plate spring or a wire spring and connected to the free end of the reel support arm 27, and 30 designates a spring by which the sound producing member 29 is held out of engagement with the flywheel during normal operation of the apparatus. Reference numeral 31 designates a stopper to limit the displacement of the reel support arm 27 under the tension of the tape and 32 designates a pin which defines the position of the reel support arm 27 in the normal condition.

When the tape 6 has been paid up, and the supply reel hub 4 and, therefore, the supply reel support shaft 2 are pulled by the tape, the support arm 27 with the support shaft 2 mounted thereon pivots about the pivot pin 28 against the biasing force of the spring 30, from the position defined by the stopper 32 to the position defined by the stopper 31. As a result, the sound producing member 29 is urged against the peripheral surface of the flywheel 26. The peripheral surface of the flywheel 26 is knurled as shown in FIG. 6. Therefore, the rubbing engagement between the sound producing member 29 and the knurled peripheral surface of the flywheel 26 produces a sound.

Needless to say, the rotating body co-operating with the sound producing member is not necessarily restricted to the shapes shown in the above embodiments but may be of many other shapes. For example, a gear 34 as shown in FIG. 5 or a flywheel 26 having a pin projecting from the under-side thereof as shown in FIG. 7 may also be used as the rotating body. When use is made of such rotating body, the sound producing member 33 shown in FIG. 4 is not needed.

Figures 3, 4, 5, 6, 7, 8:
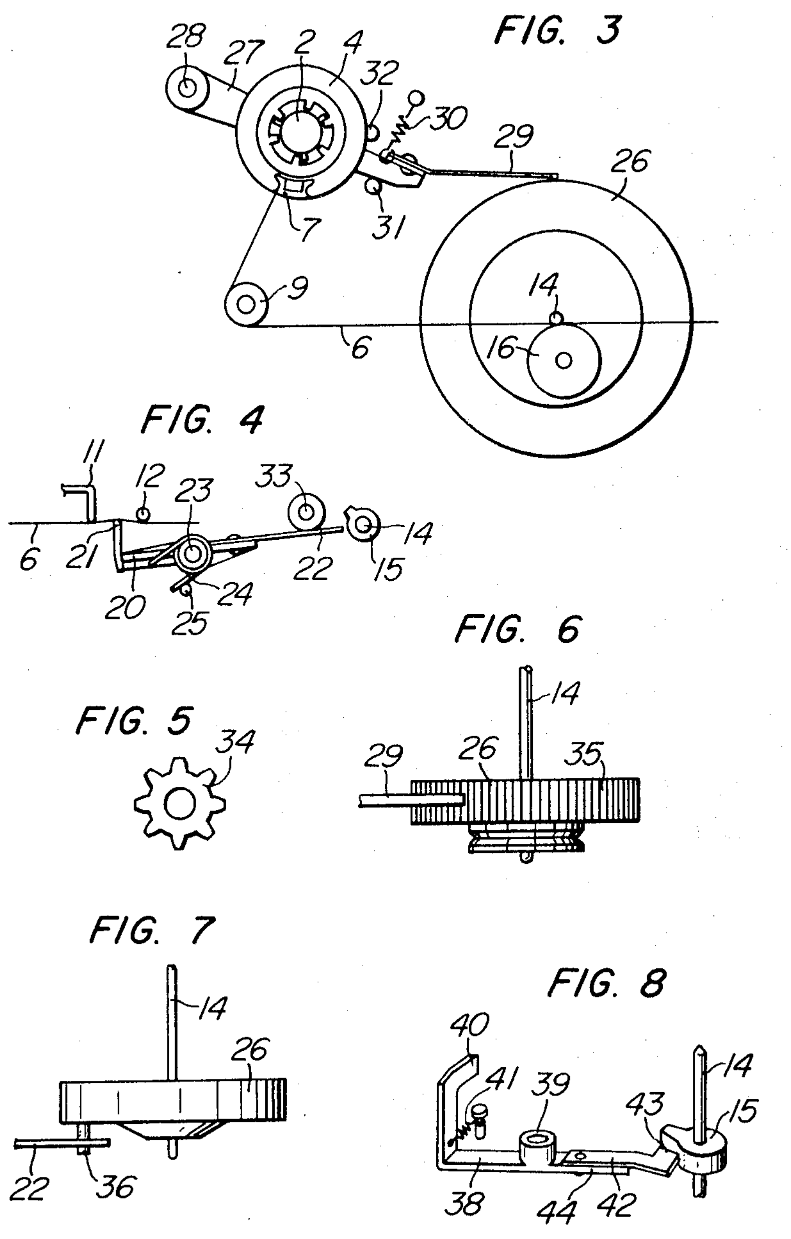
FIG. 3 is an embodiment of the present invention applicable to a magnetic tape recording and/or reproducing apparatus of the type having a movable reel support, said embodiment being in a position when the magnetic tape has been used up to the terminal end thereof.
FIG. 4 is a plan view showing the principal portion of the device of this invention shown in FIG. 2.
FIGS. 5, 6, 7 and 8 are views exemplifying various sound producing means used in the present invention.

Alternatively, a device as shown in FIG. 8 may be used which comprises a tension lever 38 and an elastic plate 42 having one end secured to a flat end 44 of said tension lever 38 as by a rivet, with the other end 43 projecting from the end extremity of said tension lever at an angle thereto for engagement with the projection of the rotating body 15, said end 43 of the elastic plate 42 being lifted slightly each time it is engaged by the projection of the rotating body and dropped upon being released from the engagement, whereby the flat end portion 44 of the lever 38 is strongly slapped by the plate 42 to produce a sound. In FIG. 8, reference numeral 39 designates a boss by which the lever 38 is mounted on a shaft, 40 a lug which is maintained in pressure contact with the tape, and 41 a spring to bias the entire device toward the tape. By employing the arrangement as described above wherein the plane of displacement of the lever and the direction of displacement of the elastic plate are in substantially perpendicular relation, it is possible to produce a large impact sound reliably even when the tension increase of the tape is minor, as the force to cause a displacement of the elastic plate 42 is afforded by the rotating body 15.

In the embodiments described and illustrated herein, the sound producing member is directly provided on the tension sensing element. It will obviously be understood, however, that the arrangement may be made such that the sound producing member or an abutting member is provided separately from the tension sensing element so as to be displaced by the displacement of said tension sensing element.

It will also be readily understood that when the tape is not fixed to the reel hub, the purpose of the present device can be attained by sensing a reduction in tension of the tape, instead of an increase in tension of the tape.

What is claimed is:

1. A tape termination alarm device for a magnetic tape apparatus for sounding an alarm to alert the user thereof to the termination of tape feeding, comprising a tension change sensing element adapted to sense a change of tension in the tape by engagement with said tape, a sound producing member, and a rotating body adapted to keep on rotating after the termination of tape feeding, said sound producing member adapted for operative engagement with said rotating body by said tension change sensing element which is displaceable upon a change of the tape tension.

2. A tape termination alarm device in a magnetic tape apparatus, as defined in claim 1, wherein said tension change sensing element is a tension arm provided on a plate which is movable toward the tape with a recording head carried thereon, and said rotating body is an irregularly shaped body rotating integrally with the shaft of a capstan.

3. A tape termination alarm device in a magnetic tape apparatus, as defined in claim 1, wherein said tension change sensing element is a reel support which is supported in such a manner that it is displaced as a result of the tape tension being changed.

4. A tape termination alarm device in a magnetic tape apparatus, as defined in claim 1, additionally comprising an abutting member, and a sound producing element, and wherein said rotating body has an irregularly shaped portion, adapted so that a displacement of said tension change sensing element causes a displacement of said abutting member which is mounted to bring it into intermittent engagement with the irregularly shaped portion of said rotating body, and said abutting member is adapted to beat said sound producing element to produce a sound.

5. A tape termination alarm device in a magnetic tape apparatus, as defined in claim 1, wherein said tension change sensing element has elastically mounted thereon an abutting member for engagement with said rotating body when a displacement of said element is caused by a change in tension of the tape, and said abutting member and said tension change sensing element are adapted for producing an impact sound when the tape feeding is terminated.

6. A tape termination alarm device in a magnetic tape apparatus, as defined in claim 5, wherein said rotating body has an irregularly shaped portion, and wherein the plane of displacement of said abutting member toward the rotating body and the direction of displacement of said abutting member caused by said irregularly shaped portion of said rotating body are substantially perpendicular to each other.

* * * * *